United States Patent
Tsaliah et al.

(10) Patent No.: US 10,421,552 B2
(45) Date of Patent: Sep. 24, 2019

(54) APPARATUS AND METHOD FOR RAPID DEPLOYMENT OF A PARACHUTE

(71) Applicant: PARAZERO LTD., Beer Sheva (IL)

(72) Inventors: Amir Tsaliah, Haifa (IL); Ran Krauss, Beer Sheva (IL)

(73) Assignee: PARAZERO LTD., Beer Sheva (IL)

( * ) Notice: Subject to any disclaimer, the term of this patent is extended or adjusted under 35 U.S.C. 154(b) by 303 days.

(21) Appl. No.: 15/030,533

(22) PCT Filed: Oct. 22, 2014

(86) PCT No.: PCT/IL2014/050920
§ 371 (c)(1),
(2) Date: Apr. 19, 2016

(87) PCT Pub. No.: WO2015/059703
PCT Pub. Date: Apr. 30, 2015

(65) Prior Publication Data
US 2016/0251083 A1     Sep. 1, 2016

(30) Foreign Application Priority Data

Oct. 24, 2013  (IL) .......................................... 229068

(51) Int. Cl.
*B64D 17/72* (2006.01)
*B64D 17/76* (2006.01)
*A62B 1/00* (2006.01)

(52) U.S. Cl.
CPC .............. *B64D 17/725* (2013.01); *A62B 1/00* (2013.01); *B64D 17/76* (2013.01)

(58) Field of Classification Search
CPC ...... B64D 17/62; B64D 17/72; B64D 17/725; B64D 17/76; A62B 1/00

(Continued)

(56) References Cited

U.S. PATENT DOCUMENTS 2,953,333 A * 9/1960 Stencel ................ B64D 17/383
244/147
3,133,718 A * 5/1964 Stencel ................ B64D 17/383
244/147

(Continued)

FOREIGN PATENT DOCUMENTS

| CN | 1517272 A | 8/2004 |
| CN | 101767651 A | 7/2010 |

(Continued)

OTHER PUBLICATIONS

International Search Report for PCT/IL2014/050920, dated Jan. 25, 2015.

(Continued)

*Primary Examiner* — Richard R. Green
*Assistant Examiner* — Brady W Frazier
(74) *Attorney, Agent, or Firm* — Fisherbroyles, LLP; Robert Kinberg (57) ABSTRACT

The present invention relates to a parachute deploying apparatus, comprising: a) a manifold with which is releasably coupled a single vessel within which pressurized gas is generated; b) a gas generator which cooperates with said vessel; c) a plurality of hollow tubes which extend obliquely and upwardly from, and are in communication with, said manifold; and d) a plurality of projectiles, each of which formed with a rod that is receivable in a corresponding tube and to each of which is connected a cord that is also connected to a corresponding portion of an undeployed parachute, wherein the pressurized gas which is generated upon triggering of said gas generator is flowable through each of said tubes to propel said plurality of projectiles in different directions and to cause said parachute to become deployed.

16 Claims, 11 Drawing Sheets

(58) Field of Classification Search
USPC .......................................................... 244/149
See application file for complete search history.

(56) References Cited

U.S. PATENT DOCUMENTS

| | | | | |
|---|---|---|---|---|
| 3,281,098 A | * | 10/1966 | Stencel | ................ B64D 17/383 244/149 |
| 3,423,054 A | * | 1/1969 | Stencel | .................. B64D 17/54 244/149 |
| 3,447,769 A | * | 6/1969 | Britton, Jr. | ........... B64D 17/383 244/149 |
| 3,638,287 A | * | 2/1972 | Wright | ................. B64D 17/383 24/602 |
| 3,759,469 A | * | 9/1973 | Nimylowycz | ....... B64D 17/383 244/142 |
| 3,926,391 A | * | 12/1975 | Nordine | ............... B64D 17/725 244/149 |
| 4,105,173 A | | 8/1978 | Bucker | |
| 4,257,568 A | | 3/1981 | Bucker | |
| 5,169,093 A | * | 12/1992 | Schoffl | ................... B64D 17/72 102/387 |
| 5,409,187 A | * | 4/1995 | Dunham | ................... B63C 9/26 102/340 |
| 5,516,903 A | | 5/1996 | Singh et al. | |

FOREIGN PATENT DOCUMENTS

| | | |
|---|---|---|
| EP | 336910 A1 | 10/1989 |
| EP | 0716015 B1 | 8/2002 |
| WO | 2005/012086 A2 | 2/2005 |

OTHER PUBLICATIONS

Written Opinion for PCT/IL2014/050920, dated Jan. 25, 2015.
Chinese Office Action, dated Dec. 22, 2016, in related CN Appln. No. 201480058600.1, and English translation thereof.

* cited by examiner

APPARATUS AND METHOD FOR RAPID DEPLOYMENT OF A PARACHUTE

FIELD OF THE INVENTION

The present invention relates to the field of parachutes. More particularly, the invention relates to an apparatus and method for rapid deployment of a parachute.

BACKGROUND OF THE INVENTION

The deployment of a parachute according to prior art methods involves several steps, including a triggering action initiated by an operator or a user which causes the parachute canopy to be longitudinally extracted from the compartment in which it is stored, and a passive inflation process characterized by an influx of ambient air into the canopy which causes the latter to expand until achieving the desired canopy diameter. The canopy expansion is generally resisted by structural tension of the canopy fabric and by inertia, taking on the order of at least 5 seconds until fully expanded. Such a delay corresponds to a significant drop of tens of meters.

During an foreseen skyscraper related catastrophic event, such as an earthquake or a terroristic activity, people entrapped within the skyscraper generally do not have time enough to escape imminent danger by descending a stairwell to a plaza surrounding the building.

The most expedient way of escaping danger during such events would be by jumping from an upper story floor while deploying a parachute to slower the rate of descent. It would be desirable to provide apparatus by which a parachute could be rapidly deployed.

Some prior art apparatus is known for rapidly deploying a parachute, such as EP 336910, U.S. Pat. No. 4,257,568, 5,516,903, and CN 101767651. However, the time needed for fully deploying such prior art apparatus until the canopy is sufficiently inflated and expanded is excessive, precluding the use thereof for parachuting from a relatively low story of a building. Also, the prior art apparatus is either heavy, complicated to deploy or expensive, and is therefore not suitable for large scale use during a catastrophic event.

It is an object of the present invention to provide an apparatus and method for deploying a parachute at a significantly more rapid rate than what is achievable by prior art methods.

It is an additional object of the present invention to provide apparatus for rapidly and reliably deploying a parachute that is light, of simple construction, and inexpensive.

Other objects and advantages of the invention will become apparent as the description proceeds.

SUMMARY OF THE INVENTION

Broadly speaking, the present invention is directed to a method for deploying a parachute, whereby a triggering action is performed which causes a plurality of projectiles to be propelled in different directions for a predetermined distance and to thereby urge a parachute canopy to be expanded to a full extent, whereupon said canopy is inflated by ambient air.

In one aspect, the plurality of projectiles are propelled by generating pressurized gas in a vessel in fluid communication with a manifold and allowing said generated gas to flow through said manifold to each of a plurality of hollow tubes which extend obliquely and upwardly from, and are in communication with, said manifold.

The present invention is also directed to parachute deploying apparatus, comprising a manifold with which is releasably coupled a single vessel within which pressurized gas is generated, a gas generator which cooperates with said vessel; a plurality of hollow tubes which extend obliquely and upwardly from, and are in communication with, said manifold, and a plurality of projectiles, each of which formed with a rod that is receivable in a corresponding tube and to each of which is connected a cord that is also connected to a corresponding portion of an undeployed parachute, wherein the pressurized gas which is generated upon triggering of said gas generator is flowable through each of said tubes to propel said plurality of projectiles in different directions and to cause said parachute to become deployed.

As referred to herein, directional terms such as "bottom", "top" and "upper" are described with respect to a normal orientation of the apparatus whereby the tubes extend upwardly from the manifold; however, the invention is also operable when the manifold is disposed at any other desired orientation.

The generated pressurized gas is dischargeable from an aperture formed in the vessel to an interior of the manifold and is flowable from said manifold interior through of each of the tubes simultaneously. Each of the projectiles is preferably propelled a predetermined distance by the pressurized gas.

In one aspect, the vessel contains a solid propellant consisting of materials that normally do not chemically react with each other and a pyrotechnic device for initiating a reaction with said propellant.

In one aspect, the vessel contains a compressed or liquid gas and the gas generator is a spring loaded puncturing mechanism for generating pressurized gas upon puncturing the vessel.

In one aspect, the parachute is fully deployable within less than a second, e.g. within less than 0.3 sec, following a gas generator triggering event. By virtue of such a rapid parachute deploying operation, a user will be assured of being protected by the apparatus even when jumping from a low story of a building, for example 20 m above ground level.

In one aspect, each of the projectiles is sealingly engageable with a corresponding tube.

DETAILED DESCRIPTION OF PREFERRED EMBODIMENTS

The present invention provides novel apparatus comprising propellable projectiles for rapidly deploying a parachute within a time period significantly less than a second, and even as less as 0.3 sec, to ensure a life saving parachute deployment operation when located at a relatively low altitude such as 20 m above ground level.

Figure 1:
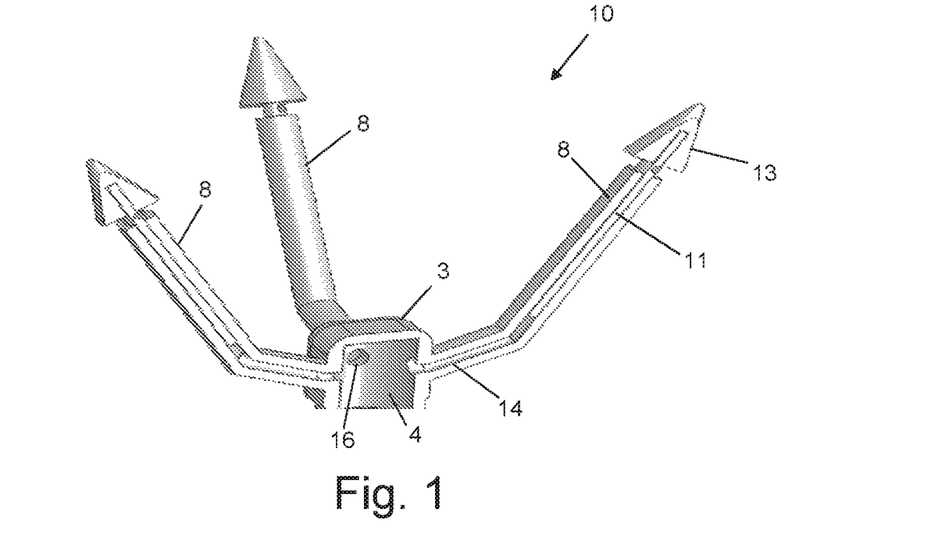
FIG. 1 is a perspective cross sectional view of a portion of parachute deploying apparatus, according to one embodiment of the present invention.

FIG. 1 illustrates apparatus 10, according to one embodiment of the present invention. Apparatus 10 comprises a substantially vertically disposed manifold 3 from which obliquely and upwardly extend a plurality of hollow tubes 8, e.g. three or four, in communication with the interior 4 of manifold 3 via a corresponding aperture 16 formed in the inner surface of the manifold. A rod 11 terminating with a larger surface projectile 13, e.g. with an arrow-shaped or tear-shaped head, is inserted into a corresponding tube 8. A draw cord is attached between each projectile 13 and a corresponding peripheral portion of the parachute canopy. These draw cords are in addition to the suspension lines that connect the canopy to the object to be parachuted, as well known to those skilled in the art.

Figure 13:
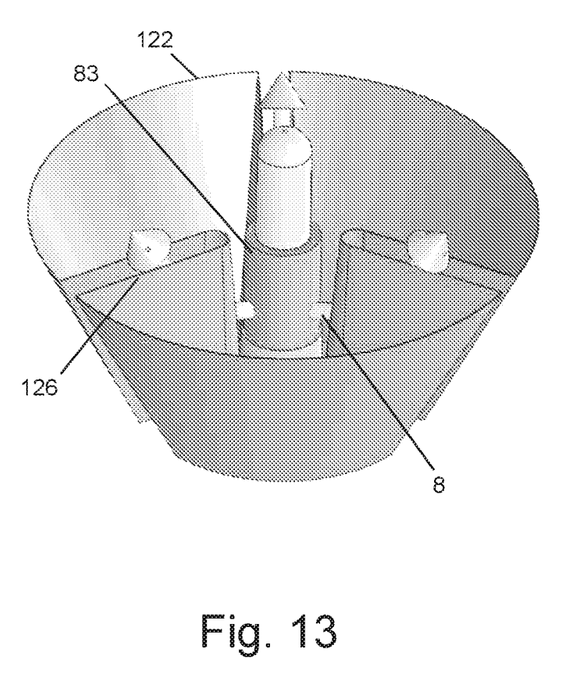
FIG. 13 is a perspective view of a chamber within which the apparatus of FIG. 8 is positioned and an undeployed parachute canopy is stored.

To prevent tearing, the canopy may be made of reinforced netting, for example Nylon 66 ripstop fabric The undeployed parachute canopy is folded on top of manifold 3, and is retained in a chamber illustrated in FIG. 13.

Manifold 3 may have a rectangular vertical cross section as shown, or may be configured in other ways as well.

Tubes 8 are all oriented at the same angle, e.g. 30 degrees relative to a vertical plane, to ensure uniform opening of the parachute. An intermediate tube 14 of shorter length and oriented at a larger angle than the rod receiving tubes 8 may extend from manifold 3 to a corresponding tube 8.

Figure 2:
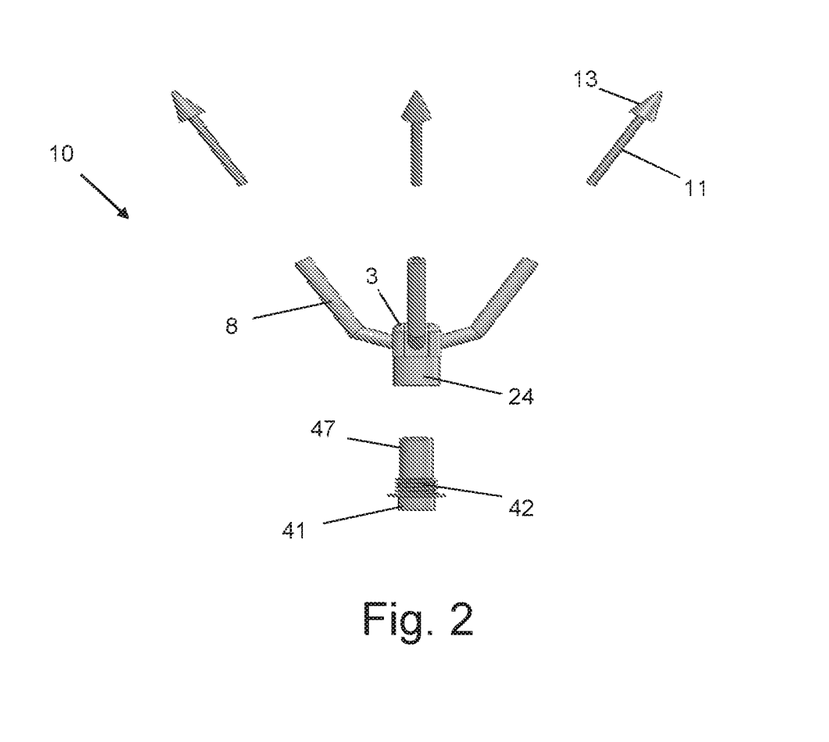
FIG. 2 is an exploded, perspective view of the parachute deploying apparatus of FIG. 1.

As shown in the exploded version of apparatus 10 in FIG. 2, a single, small sized pressure vessel 47 constituting a micro gas generator (MGG) is threadedly engageable, by external threading 42 formed in a bottom region of cylinder 41 which defines the vessel, with internal threading formed within cylinder 24 integral with, and extending downwardly from, manifold 3. Projectile 13 is shown to be integrally formed with a corresponding rod 11. All components of apparatus 10 that are exposed to the generated gas, including manifold 3, tubes 8, rods 11 and projectiles 13 are made of heat resistant material. By employing a single MGG that efficiently deploys a parachute, the weight and therefore the cost of the apparatus are significantly reduced with respect to the prior art.

Figure 3:
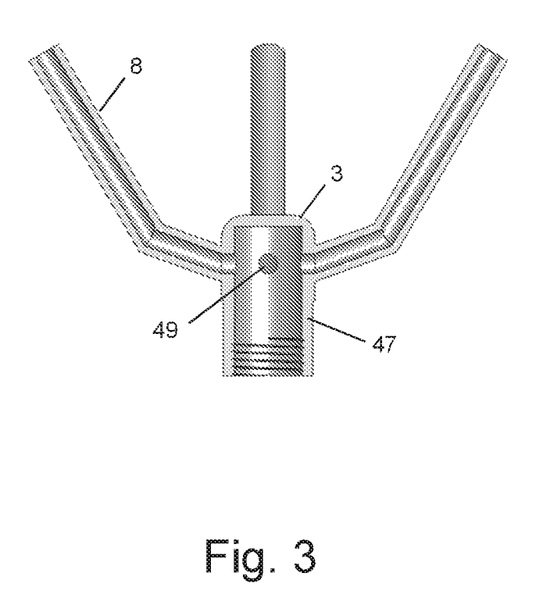
FIG. 3 is a vertical cross sectional view of a portion of the parachute deploying apparatus of FIG. 1, showing vessel comprising a gas generator coupled therewith.

As shown in FIG. 3, an aperture 49 is formed in an upper region of vessel 47, e.g. in its circumferential wall, through which the generated gas is dischargeable into the interior of manifold 3, when the vessel is fully received within the interior of the manifold, and then through the interior of each tube 8, in order to cause the projectiles to be propelled a predetermined distance.

Alternatively, pressure vessel 47 may be positioned on top of the manifold and the aperture through which the generated gas is dischargeable may be formed in a lower region of the vessel.

Figure 4:
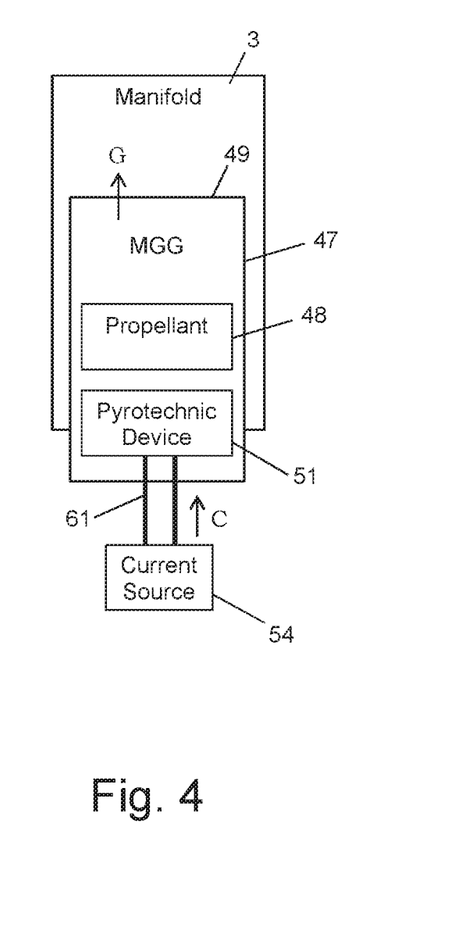
FIG. 4 is a schematic illustration of a parachute deploying event involving the vessel of FIG. 3.

Referring now to FIG. 4, vessel 47 contains a solid propellant 48 consisting of materials that normally do not chemically react with each other and a pyrotechnic device 51 for initiating a reaction with propellant 48.

The vessel 47 is of sufficiently small dimensions, e.g. having a diameter of 2 cm and a length of 7 cm, in order to be compactly retained in the manifold cylinder when not in use, yet is highly efficient in terms of its gas generating capability. A vessel 47 is replaceable upon conclusion of a parachute deployment operation.

Pyrotechnic device 51 may be activated by an electrical current source 54 for heating a conductor of the device above the ignition temperature of a combustible material in contact therewith. Ignition of the combustible material initiates the MGG, causing a rapid chemical reaction involving propellant 48 that generates a large volume of pressurized gas G, e.g. nitrogen, within the manifold interior. The materials of propellant 48 and the current and voltage supplied by electrical current source 54 may be selected so as cause a highly exothermic reaction.

Figure 5:
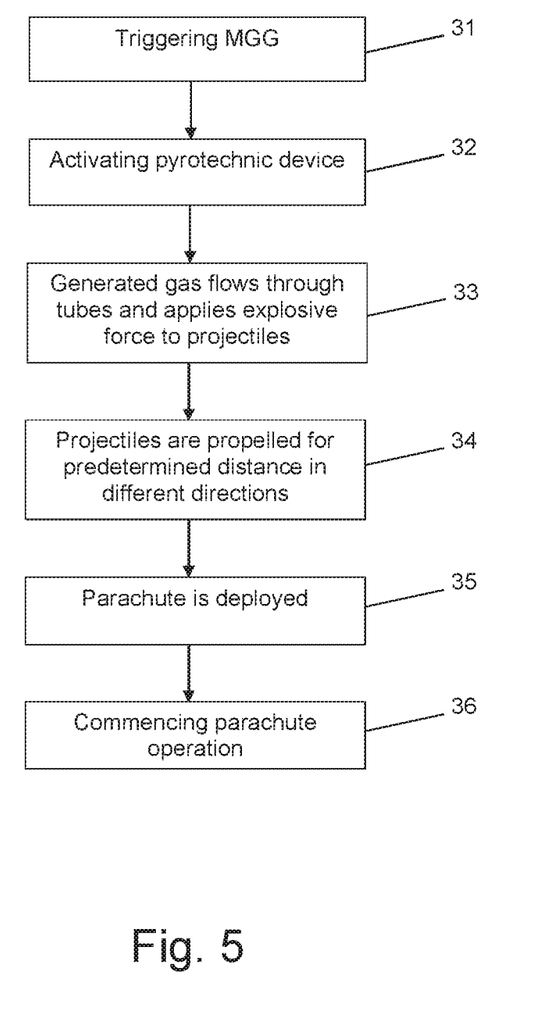
FIG. 5 is a method for deploying a parachute, according to one embodiment of the invention.

In operation as illustrated in FIG. 5, a user desiring to deploy a parachute according to the teachings of the present invention triggers the MGG in step 31 by electrical or mechanical means well known to those skilled in the art, which need not be described for purposes of brevity. As a result of the triggering operation, the pyrotechnic device becomes activated in step 32, causing the constituent components of the propellant to react and to generate energy intensive gas. The generated gas simultaneously flows through each tube extending from the manifold in step 33, applying an explosive force onto a corresponding projectile. The explosive force is converted into momentum, and each projectile is therefore propelled in a different direction for a predetermined distance in step 34. This distance, which is generally the sum of the length of the draw cord and the canopy radius, is reliably achieved by providing a sufficient dose of combustible material and a sufficient amount of activation current, to cause the parachute to be deployed in step 35 by being expanded to the desired canopy diameter.

After being deployed, ambient air is received in the interior of the parachute, causing the latter to be retained in a buoyancy generating inflated condition. While the canopy is fully expanded, the projectiles remain attached thereto by a corresponding draw cord after having transferring their kinetic energy to the canopy to urge the latter to an expanded condition. The weight of each projectile, e.g. 23 gm, is negligible with respect to the buoyancy force generated by the parachute, and therefore will not significantly impact the buoyancy of the parachute. A parachuting operation is then commenced in step 36.

In one embodiment, the projectile head is sealed within the inclined tube. In this fashion, the gas pressure within the tube can be increased, to allow the projectile to be propelled a further distance.

It will be appreciated that the various components that are exposed to the generated gas need not be made of heat resistant material when other types of gas such as carbon dioxide or nitrogen are employed.

A parachute deployment operation may be initiated by a user who is entrapped within a skyscraper during a catastrophic event. As no other means of rescue is anticipated, the user mounts a harness to which is attached the apparatus of the present invention onto his upper torso. After the user jumps from an upper story, the MGG is triggered in midair while the projectiles are propelled behind, and rearwardly from, the user, allowing the parachute to be deployed within 0.3 sec following the triggering action due to the fast acting apparatus. This parachute deploying duration corresponds to a falling distance of only approximately 2 m. By virtue of the fast acting apparatus, a user will be assured of being protected even when jumping from a relatively low altitude such as 20 m above ground level, i.e. at a low story of a building. After descending to safety, the used vessel that generated the projectile propelling gas is replaced and the deployed parachute is folded, in anticipation of another parachute deployment operation, if necessary.

It will be appreciated that a parachute deployment operation may be initiated in response to many other scenarios that require an object to be parachuted.

Alternatively, the parachute deploying apparatus may be provided on light aviation aircraft, including an unmanned aerial vehicle (UAV) and Personal Aerial Vehicle (PAV), regardless of shape, construction material and geometry.

Figure 6:
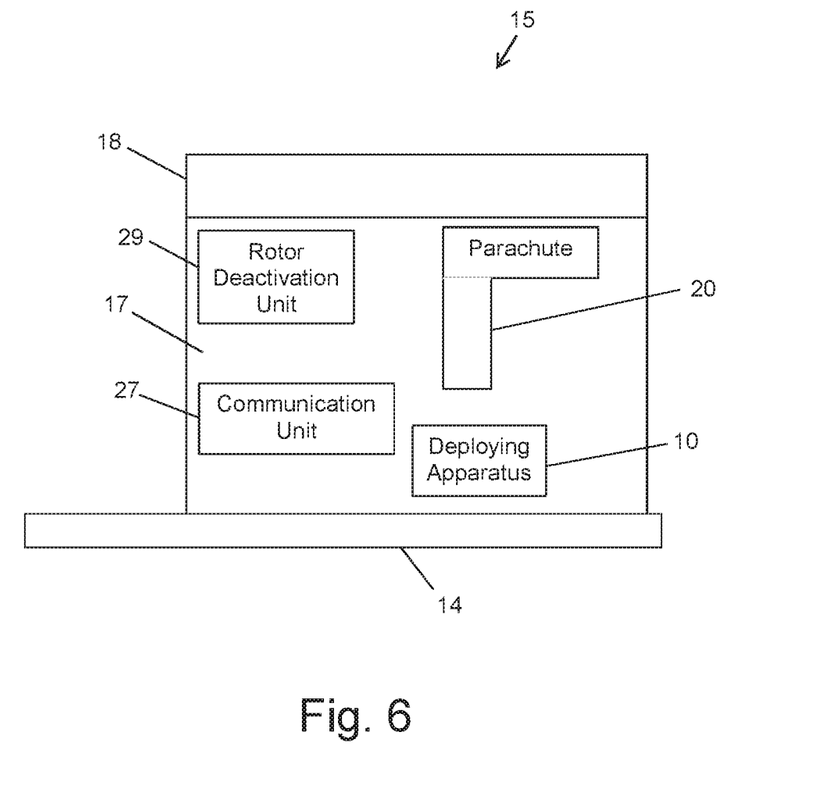
FIG. 6 is a block diagram of safety apparatus including an undeployed parachute assembly and the apparatus of FIG. 1.
Figure 7:
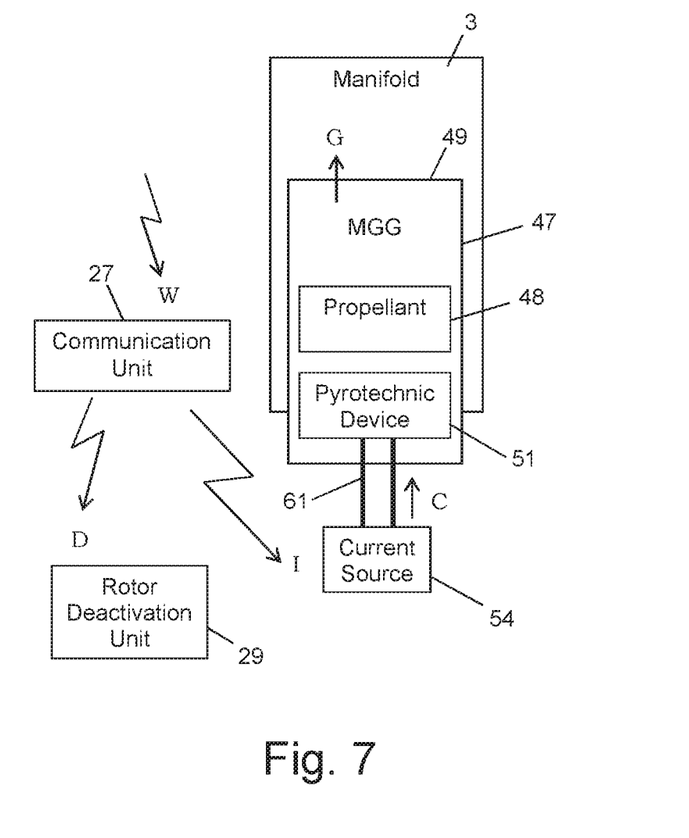
FIG. 7 is a schematic illustration of a parachute deploying event involving the safety apparatus of FIG. 6.

In this embodiment, as schematically illustrated in FIGS. 6 and 7, safety apparatus 15 is retained within a chamber 17 attached to a support element 14 of the aircraft and has a detachable lid 18. Safety apparatus 15 may comprise expandable parachute assembly 20 shown in a folded condition, parachute deploying apparatus 10 for instantly deploying parachute assembly 20, e.g. made of Kevlar, upon demand, a wireless communication unit 27 for remotely controlling operation of the safety apparatus, and a rotor deactivation unit 29 synchronized with parachute deploying apparatus 10 for preventing damage to the parachute when being expanded. Lid 18 becomes detached from chamber 17 when the parachute becomes sufficiently expanded so as to apply a force onto the lid.

An operator interacting with a remote flight controller may transmit a wireless duress indicating signal W to the transceiver of communication unit 27 upon detection that the UAV has been subjected to conditions of duress requiring deployment of the parachute. After receiving signal W, communication unit 27 transmits a deactivation signal D for operating rotor deactivation unit 29, which is in electrical communication with a controller of the rotor drive means. Deactivation of the rotors will ensure that the expanding parachute will not become entangled with the rotating blades. Simultaneously with the transmission of signal D, or shortly thereafter, communication unit 27 transmits an initiation signal I to current source 54, which in turn generates a suitable current C for activating pyrotechnic device 51. Current C flows to the pyrotechnic device 51 of vessel 47 via contacts 61 extending from the bottom end of the vessel. Activation of pyrotechnic device 51 causes the constituent components of propellant 48 to react and to generate gas G, which is discharged into manifold 3 in order to propel the plurality of projectiles.

The fully deployed parachute will be able to intercept moving aircraft fragments, if any, and to sufficiently slow the descent of the disabled aircraft so as to minimize damage of a collision involving the aircraft.

The entire safety apparatus may weigh as little as 1-1.5 kg when the object to be parachuted is a human, or even less for lighter parachuted objects. For example, the safety apparatus may weigh 260 gm for a parachuted object weighing 3.5 kg or 450 gm for a parachuted object weighing 7 kg.

FIGS. 8-13 illustrate another embodiment of the invention whereby the pressurized gas is generated by means of a spring loaded puncturing mechanism for generating pressurized gas, e.g. carbon dioxide, on demand upon puncturing a vessel containing compressed or liquid gas.

Figure 8:
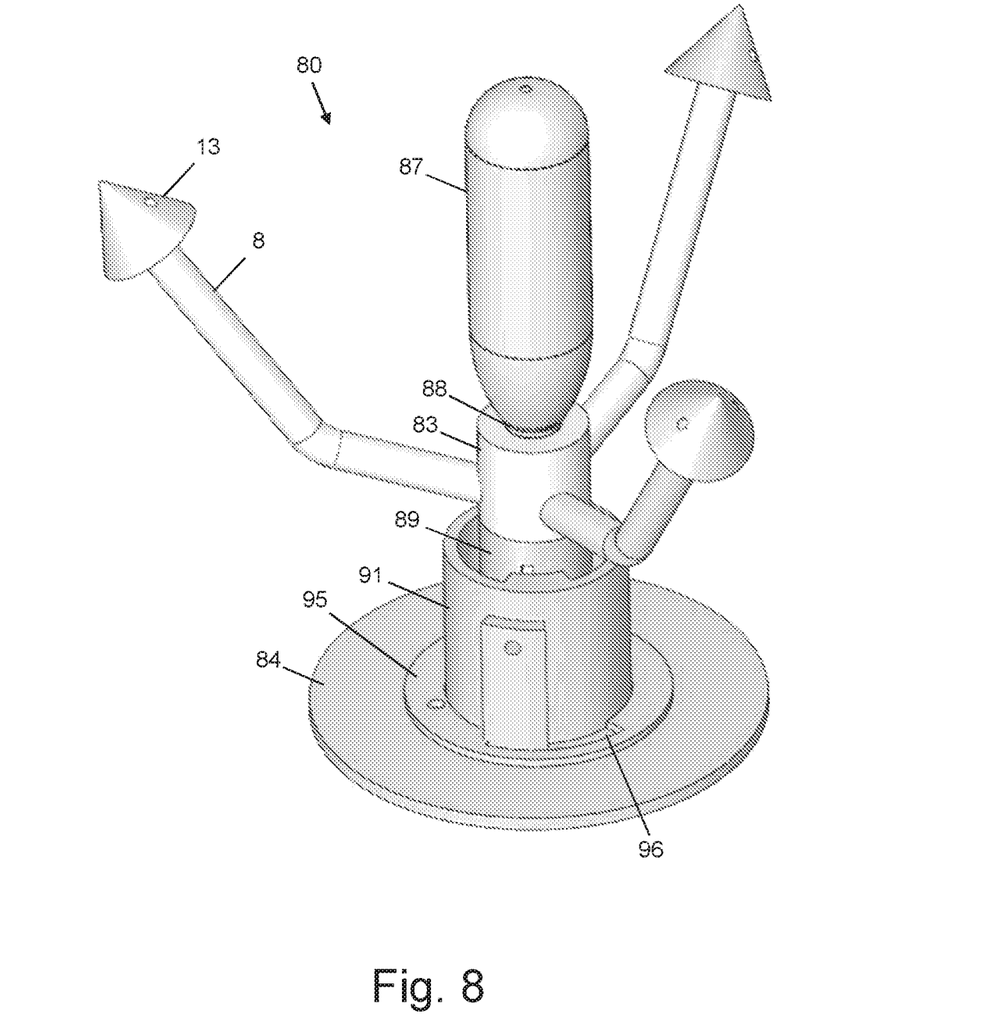
FIG. 8 is a perspective view of parachute deploying apparatus, according to another embodiment of the invention.

FIG. 8 illustrates an assembled, ready to trigger parachute deploying apparatus 80, which comprises manifold 83 having three inclined tubes 8 into each of which a corresponding arrow-headed projectile 13 is inserted, compressed gas vessel 87 releasably engaged with the top of manifold 83, hollow spring housing 89 threadedly engageable with manifold 83 and in which is housed a spring and hammer for driving the puncturing mechanism, an outer tubular rotatable element 91 for encircling spring housing 89 and for selectively releasing a vertically displaceable hammer, and a bottom circular plate 95 positioned above larger circular plate 84 and below rotatable element 91 which is formed with a groove 96 for limiting angular displacement of element 91. At the mouth 88 of vessel 87 is formed a pierceable metallic diphragm, generally near the threading of the vessel.

Figure 9:
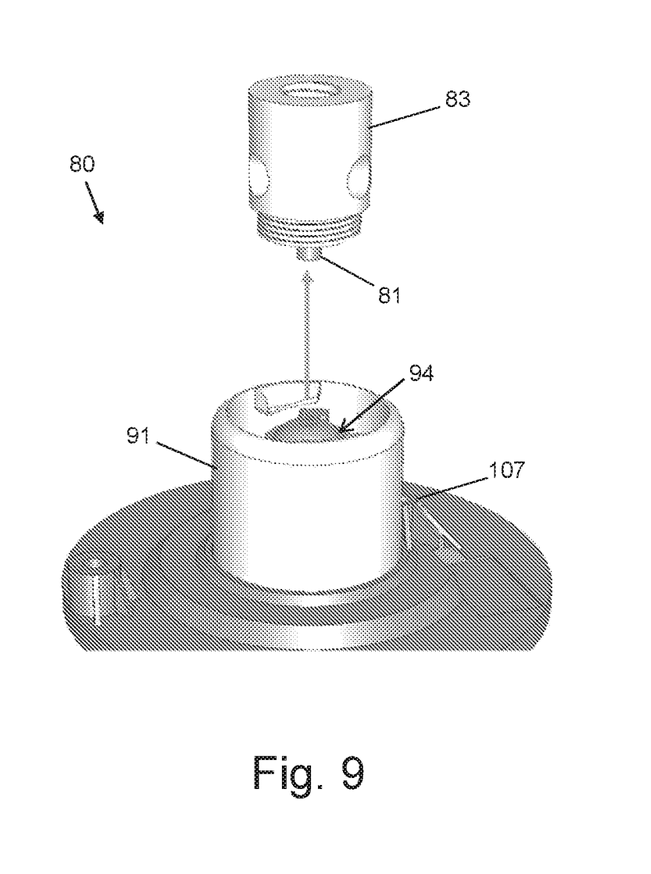
FIG. 9 is a schematic, perspective view of the apparatus of FIG. 8 when the spring housing is removed, showing a vertically displaceable hammer for initiating a gas generation event.

FIG. 9 schematically illustrates apparatus 80 when the spring housing is removed, showing hammer 94 positioned internally to rotatable element 91 and which is vertically displaceable, on release of the spring force provided within the spring housing, at a sufficiently high speed to upwardly drive the bottom of pointed striking pin 81 so as to pierce the diaphragm and cause the liquid gas to change state in order to suitably propel the projectiles. Striking pin 81 is normally positioned within manifold 83 below the diaphragm of the gas generating vessel.

Figure 10:
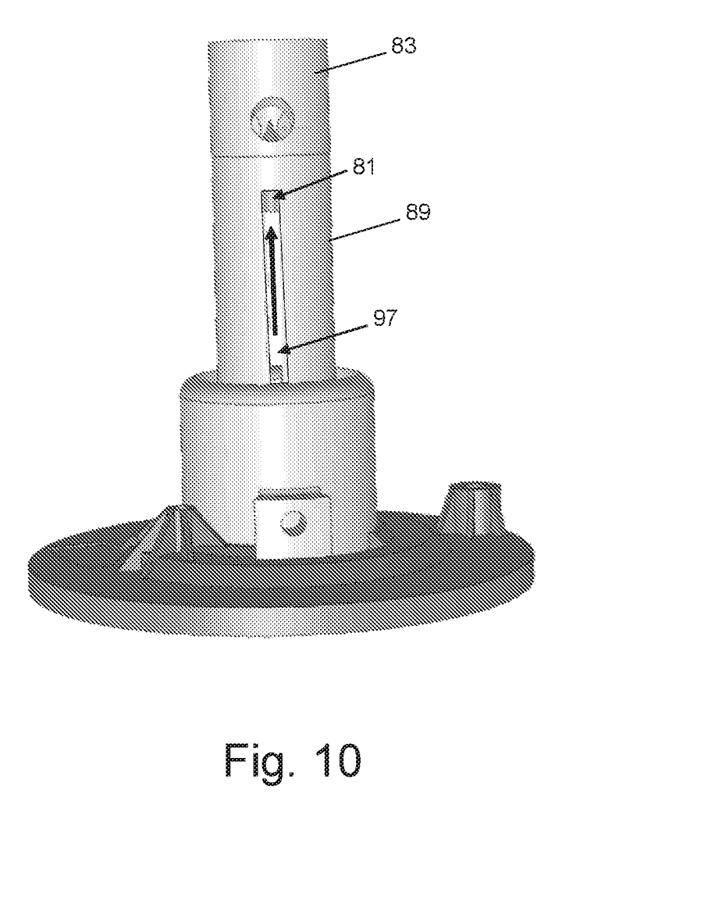
FIG. 10 is a side view of the apparatus of FIG. 8 when the hammer and manifold tubes are removed, showing the striking pin in a vertically displaced position.

FIG. 10 illustrates striking pin 81 after it has been upwardly driven. As shown, spring housing 89 is formed with two opposed vertical grooves 97 through each of which a corresponding arm of the hammer is able to pass.

Figure 11:
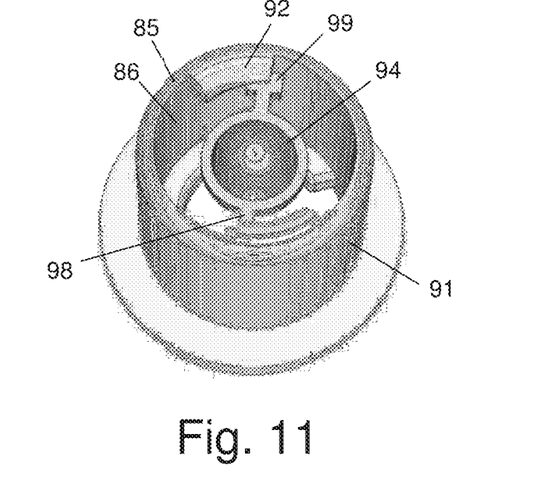
FIG. 11 is a perspective view from the top of the apparatus of FIG. 8 when the manifold and spring housing are removed, showing the hammer in a restrained position.

FIG. 11 illustrates the means for selectively releasing hammer 94. Rotatable element 91 has two opposed restrainers 92 circumferentially extending a limited distance along its inner face 86, adjacent to its rim 85. After the spring within the spring housing is tensed by an external tensioning device, as well known to those skilled in the art, hammer 94 is positioned such that the two protrusions 99 terminating at the end of a corresponding arm 98 which radially extends from the main central portion of the hammer are below a corresponding restrainer 92 and prevented from moving. When rotatable element 91 is circumferentially shifted, protrusions 99 become unrestrained, allowing hammer 94 to be vertically displaced.

Figure 12:
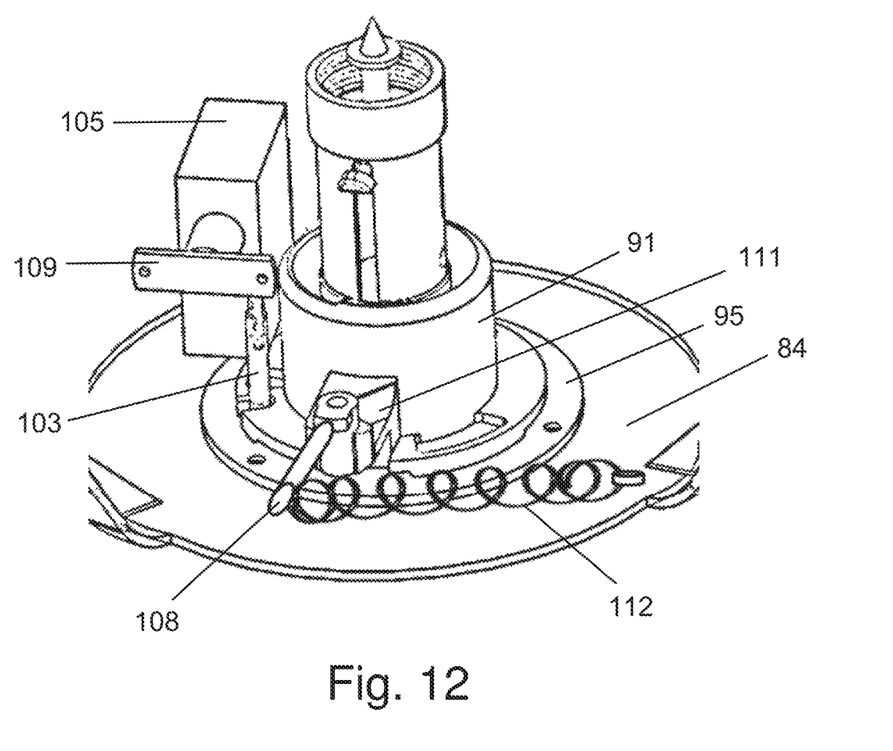
FIG. 12 is a perspective view of the apparatus of FIG. 8 when the manifold is removed, showing a disengaging unit for initiating rotation of a rotatable element.

FIG. 12 illustrates the disengaging unit, for initiating rotation of rotatable element 91 and the resulting forceful vertical displacement of the hammer. External spring 112 is attached at one end to bottom plate 84 and at the other end to rod 108 horizontally extending from rotatable element 91, for example from block 111 attached to the outer wall of rotatable element 91. After upper plate 95 is rotated to extend external spring 112, vertically oriented pin 103 in releasable engagement with ring 107 (FIG. 9) protruding outwardly from rotatable element 91 is inserted within an aperture formed in plate 95, to secure rotatable element 91 while external spring 112 is tensed. Electrical motor 105, e.g. a servomotor, rotatably drives cam 109, when activated, to disengage pin 103 from plate 95 and to enable angular displacement of rotatable element 91 upon release of the spring force applied by external spring 112.

FIG. 13 illustrates circular chamber 122 in which the undeployed parachute is stored. Chamber 122 has a discontinuous wall, which is provided with a plurality of circumferentially spaced U-shaped portions 126 extending vertically along the entire height of chamber 122. Manifold 83 is positioned within the interior of chamber 122, internally to each of the U-shaped portions 126. To facilitate positioning of each projectile rod 8 within the interior of a corresponding U-shaped portion 126 in preparation to be propelled, the internal wall of each U-shaped portion 126 facing manifold 83 may be formed with a bottom groove. Chamber 122 is connected to the object to be parachuted.

Alternatively, the puncturing mechanism is also operable when the compressed gas vessel is releasably engaged with the bottom of the manifold.

EXAMPLE

The parachute deploying apparatus weighing 450 gm was carried by a multi-rotor UAV having a weight of 7 kg, a diameter of 1.10 m and a height of 0.5 m. The canopy was made of Nylon 66 ripstop fabric, and had a diameter of 1.75 m. Six suspension lines, each having a length of 1.6 m, were connected to the aircraft. Three draw cords, each having a length of 25 cm, were connected to a corresponding projectile configured with an arrow-shaped head.

Three inclined tubes extended from the manifold. A projectile having a weight of 23 gm, and an arrow-shaped head connected to a rod having a length of 6 cm was inserted within a corresponding tube. Flexible polymeric material was applied to the tubes, providing sealing after insertion of the corresponding projectile therewithin.

The single MGG that was threadedly engageable with the manifold was the Autoliv A7Zr2.1, IMI-Type 610258300, manufactured by Autoliv, Ogden, Utah. The MGG had a diameter of 1.5 cm and a length of 4 cm. The pyrotechnic device produced 8 liters of nitrogen.

The projectiles were propelled a distance of 112.5 cm within a time period of 0.28 seconds after the trigger was initiated.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. Fast acting deploying apparatus, comprising:
    a) a chamber in which an undeployed parachute is retained and attached to an object to be parachuted;
    b) a manifold positioned within an interior of, and fixed to, said chamber, with said manifold is releasably coupled a single vessel within which pressurized gas is generated;
    c) a gas generator which cooperates with said vessel;
    d) a plurality of hollow tubes which extend obliquely and upwardly from, and are in fluid communication with, said manifold; and
    e) a plurality of projectiles, each of which formed with a rod that is receivable in a corresponding one of said tubes and to each of which is connected a cord that is also connected to a corresponding portion of said undeployed parachute,
        wherein the pressurized gas which is generated upon triggering of said gas generator is flowable through each of said tubes to propel said plurality of projectiles in different directions and to cause said parachute to become deployed,
    wherein said apparatus is configured to cause said parachute to achieve a desired canopy diameter simultaneously with ejection of said parachute from said chamber.

2. The apparatus according to claim 1, wherein each of the projectiles is propelled a predetermined distance by the pressurized gas.

3. The apparatus according to claim 1, wherein the parachute is fully deployable within less than a second following a gas generator triggering event.

4. The apparatus according to claim 3, wherein the parachute is fully deployable within less than 0.3 sec following a gas generator triggering event.

5. The apparatus according to claim 1, wherein each of the projectiles is sealingly engageable with a corresponding tube.

6. The apparatus according to claim 1, wherein the vessel contains a solid propellant consisting of materials that normally do not chemically react with each other and a pyrotechnic device for initiating a reaction with said propellant.

7. The apparatus according to claim 1, wherein the generated pressurized gas is dischargeable from an aperture formed in the vessel to an interior of the manifold and is flowable from said manifold interior through of each of the tubes simultaneously.

8. The apparatus according to claim 1, wherein the vessel contains a compressed or liquid gas and the gas generator is a spring loaded puncturing mechanism for generating pressurized gas upon puncturing the vessel.

9. A method for rapidly deploying a parachute, comprising the steps of:
    a) positioning a manifold, from which a plurality of hollow tubes extend obliquely and upwardly, and are in fluid communication therewith, within an interior of a chamber attached to an object to be parachuted, wherein a single vessel within which pressurized gas is generatable is releasably coupled with said manifold;
    b) introducing a rod terminating with a projectile of an increased cross sectional area into a corresponding one of said tubes and connecting a cord to said projectile and to a corresponding portion of an undeployed parachute;
    c) storing said parachute within said chamber so as to be in a folded condition such that each folded portion of the parachute is separated without contact from another folded portion; and
    d) performing a triggering action which causes pressurized gas generated within the vessel to flow through said manifold to each of said plurality of oblique hollow tubes and each of said projectiles to be propelled in different directions for a predetermined distance, whereby said parachute achieves a desired canopy diameter simultaneously with ejection of said parachute from said chamber.

10. The apparatus according to claim 2, wherein the predetermined distance by which each of the projectiles is propelled is equal to a sum of a length of the cord that is connected to the corresponding portion of said undeployed parachute and a radius of a canopy of a fully deployed parachute.

11. The apparatus according to claim 1, wherein the chamber has a discontinuous exterior wall configured with a plurality of peripherally spaced U-shaped portions extending vertically along an entire height of the chamber, each of said U-shaped portions extending inwardly from said exterior wall into the chamber interior and spaced from the manifold and having an interior within which a corresponding hollow tube extending obliquely from the manifold and receiving one of the projectile rods is positioned.

12. The apparatus according to claim 11, wherein each of the U-shaped portions constitutes a barrier between different folded portions of the parachute to facilitate interference-free ejection of each of said folded portions from the chamber with respect to another one of said folded portions as well as simultaneous parachute ejection and deployment.

13. The apparatus according to claim 2, wherein the object to be parachuted to which the chamber is attached is a rotorcraft.

14. The apparatus according to claim 13, further comprising drive means for a rotor of the rotorcraft, a controller of the rotor drive means, and a rotor deactivation unit in electrical communication with said controller, wherein deactivation of each rotor of the rotorcraft by said rotor deactivation unit ensures that the parachute that is being expanded following the gas generator triggering event will not become entangled with rotating rotor-associated blades.

15. The method according to claim 9, wherein the parachute achieves the desired canopy diameter within less than a second following performance of the triggering action.

16. The method according to claim 15, wherein the parachute achieves the desired canopy diameter within less than 0.3 sec following performance of the triggering action.

* * * * *